United States Patent
Cosimini et al.

(10) Patent No.: US 9,246,556 B2
(45) Date of Patent: Jan. 26, 2016

(54) RADIO NETWORK CONTROL

(75) Inventors: Peter Cosimini, Newbury (GB); Andrew Dunkin, Newbury (GB); Paul Edwards, Newbury (GB)

(73) Assignee: VODAFONE IP LICENSING LTD., Newbury, Berkshire (GB)

( * ) Notice: Subject to any disclaimer, the term of this patent is extended or adjusted under 35 U.S.C. 154(b) by 460 days.

(21) Appl. No.: 13/252,759

(22) Filed: Oct. 4, 2011

(65) Prior Publication Data

US 2012/0082097 A1 Apr. 5, 2012

(30) Foreign Application Priority Data

Oct. 4, 2010 (GB) .................................. 1016683.3

(51) Int. Cl.
| | | |
|---|---|---|
| *H04B 7/02* | (2006.01) | |
| *H04L 1/20* | (2006.01) | |
| *H04B 7/08* | (2006.01) | |
| *H04W 72/08* | (2009.01) | |
| *H04L 1/00* | (2006.01) | |
| *H04L 27/26* | (2006.01) | |

(52) U.S. Cl.
CPC ........ *H04B 7/022* (2013.01); *H04L 1/20* (2013.01); *H04B 7/0802* (2013.01); *H04B 7/084* (2013.01); *H04B 7/0857* (2013.01); *H04L 1/0021* (2013.01); *H04L 27/2601* (2013.01); *H04W 72/085* (2013.01)

(58) Field of Classification Search
USPC ............ 370/310.2, 328–339, 349; 455/422.1, 455/432.1, 436–444
See application file for complete search history.

(56) References Cited

U.S. PATENT DOCUMENTS

| | | |
|---|---|---|
| 6,330,458 B1 | 12/2001 | Lamoureux et al. |
| 6,628,638 B1 | 9/2003 | Sato et al. |
| 6,920,192 B1 | 7/2005 | Laroia et al. |
| 2004/0106412 A1* | 6/2004 | Laroia et al. ............... 455/448 |
| 2004/0233841 A1 | 11/2004 | Sanada et al. |
| 2006/0258402 A1 | 11/2006 | Guillouard |
| 2007/0293234 A1* | 12/2007 | Kim et al. ................. 455/455 |
| 2008/0051046 A1 | 2/2008 | Ruckriem |
| 2008/0214196 A1* | 9/2008 | Sambhwani et al. ....... 455/446 |
| 2008/0254799 A1* | 10/2008 | Yahagi ....................... 455/436 |
| 2008/0298445 A1 | 12/2008 | Richardson et al. |

(Continued)

FOREIGN PATENT DOCUMENTS

| | | |
|---|---|---|
| GB | 2324932 | 11/1998 |
| KR | 100896893 | 7/2007 |

OTHER PUBLICATIONS

EP Search Report for EP11275119.3, Dec. 2, 2011.

(Continued)

*Primary Examiner* — Hoon J Chung
(74) *Attorney, Agent, or Firm* — B. Aaron Schulman, Esq.; Stites & Harbison, PLLC.

(57) ABSTRACT

A radio network control method that allows uplink signals transmitted by a mobile station to be received by two or more selected base station radio systems and then combined, thus providing receiver diversity. The method requires measurement of radio link qualities of the OFDM signals passing between mobile station and base station radio system. The method is selectively applied to individual mobile stations and for each mobile station to a selection from the available base station radio systems—the selection being based upon the relative and/or absolute measurements of radio link qualities.

18 Claims, 3 Drawing Sheets

(56) References Cited

U.S. PATENT DOCUMENTS

| | | | |
|---|---|---|---|
| 2009/0238063 A1* | 9/2009 | Park et al. | 370/208 |
| 2010/0222063 A1* | 9/2010 | Ishikura et al. | 455/450 |
| 2010/0317359 A1* | 12/2010 | Suga | 455/450 |

OTHER PUBLICATIONS

GB Search Report for GB1016683.3, Jan. 20, 2011.

* cited by examiner

Fig. 1

Legend
20: RF and control systems

RADIO NETWORK CONTROL

FIELD OF THE INVENTION

The invention concerns a method of operating or controlling a radio network, a network controller and an associated radio network.

BACKGROUND TO THE INVENTION

The Third Generation Partnership Project (3GPP) has developed standards for a cellular communications system, referred to as Long Term Evolution (LTE). LTE is based on transmission using Orthogonal Frequency Division Multiplexed (OFDM) signals.

An OFDM signal comprises a plurality of subcarriers, each of which is modulated to carry a transmission symbol. Data for transmission is divided into a plurality of parallel streams, one for each subcarrier. The transmission symbol for each subcarrier is generated by modulating the data using a conventional modulation scheme. Advantageously, OFDM simplifies channel equalisation, by adapting the modulation scheme applied to each sub carrier according to the narrowband propagation conditions for that subcarrier.

In cellular systems, such as LTE, base stations provide radio coverage for individual geographical areas known as cells. In fact, a base station typically comprises multiple co-located radio systems, each of which provides coverage for a different geographical area. Since the antenna of one of these radio systems usually has a directional radiation profile, limited to a well-defined angle, the radio systems are considered to provide coverage to a sector.

A mobile station generally communicates with one radio system at a time. Once communication with a radio system is established, which involves the serving radio system allocating resources to the mobile station, the radio system provides the mobile station with data. In OFDM systems, the allocation of resources can include the subcarriers, symbols timings and antennas used to communicate with the mobile station. This allocation, which is made for both uplink and downlink, can be important to optimise the data capacity available for communication between the base station radio system and the mobile station.

As the mobile station moves it can transfer its service between radio systems, in a process known as handover. In some circumstances, the mobile station can communicate with more than one radio system. The mobile station uses signals transmitted by the radio systems to identify the most appropriate one. It is desirable to make most efficient use of the allocations for each mobile station when communicating with base station radio systems.

SUMMARY OF THE INVENTION

Against this background, the present invention provides a method of operating a radio network, the radio network comprising a mobile station and a plurality of base station radio systems being configured to communicate using Orthogonal Frequency Division Multiplexed, OFDM, signals, each base station radio system being arranged to provide communications coverage over a different geographical area. The method comprises: determining a plurality of radio link qualities using OFDM signals, each radio link quality relating to a radio link between the mobile station and a respective base station radio system; and selecting first and second base station radio systems from the plurality of base station radio systems for receiving OFDM signals from the mobile station and for combining the received OFDM signals, the selection being based on the determined plurality of radio link qualities.

This method allows uplink signals transmitted by a mobile station to be received by two or more selected base station radio systems. The received signals can then be combined in order to benefit from receiver diversity. This increases capacity, coverage, throughput and quality of the received signals, demonstrated by bit error rate, for example. The radio systems are selected using the determined OFDM link qualities, which allows the selection to be made using the whole or a portion of the total transmission bandwidth.

Processing and combining signals from multiple mobile stations over multiple base station radio systems can be a relatively processor-intensive process. Nevertheless, by selecting only some of the mobile stations and, for each mobile station, only some of the base station radio systems for use with that process, this can offer a trade off between performance and processing capability in the base station.

Preferably, the step of determining a plurality of radio link qualities comprises: receiving an OFDM signal comprising a plurality of subcarriers; and determining a radio link quality on the basis of some of the subcarriers of the received OFDM signal. Not all of the subcarriers might be used, for example. Optionally, the step of determining a radio link quality comprises measuring a received power or signal to noise ratio for some of the subcarriers of the OFDM signal.

In the preferred embodiment, the step of determining a plurality of radio link qualities comprises: receiving at the mobile station a plurality of OFDM signals, each OFDM signal originating from a respective base station radio system; determining at the mobile station, each of the plurality of radio link qualities on the basis of a respective one of the plurality of received OFDM signals; and transmitting the plurality of radio link qualities from the mobile station to one of the plurality of base station radio systems. In this way, the radio link qualities are determined using the downlink signals.

Additionally or alternatively, the step of determining a plurality of radio link qualities may comprise: receiving at each of the plurality of base station radio systems an OFDM signal originating from the mobile station; and determining each of the plurality of radio link qualities on the basis of the OFDM signal received at a respective base station radio system. Then, the uplink signals can be used to determine the radio link qualities. In some embodiments, the radio link qualities could be determined on the basis of a combination of the uplink and downlink signals.

Advantageously, the step of selecting first and second base station radio systems comprises: comparing each of the plurality of radio link qualities with a threshold; and selecting the first and second base station radio systems on the basis of the comparison. The threshold can optionally be an absolute value. For example, the threshold may be set at a predetermined level. Alternatively, the threshold can be relative to other link qualities, such as the method further comprising setting the threshold on the basis of at least one of the plurality of link qualities. For instance, the threshold could be a proportion of the largest link quality, a multiple of an average link quality or based on some other statistic of the determined radio link qualities.

In the preferred embodiment, the first base station radio system comprises a plurality of radio arrangements, each radio arrangement comprising a transceiver coupled to a respective antenna. In this arrangement, each transceiver need not necessarily transmit the same data at the same time although to avoid significant interference, this can be done most of the time. In alternative arrangements, a transceiver can be coupled to multiple antennas. In an embodiment, at least some of the plurality of radio arrangements for the first base station radio system are located at different places. This would allow the base stations to make increased use of diversity reception in the uplink.

Advantageously, the radio link quality for the first base station radio system comprises a plurality of link quality values, each link quality value relating to a radio link between the mobile station and a respective radio arrangement of the first base station radio system. Then, the method may further comprise selecting a radio arrangement of the first base station radio system for receiving OFDM signals from the mobile station and for use in combining the received OFDM signals, the selection being based on the determined plurality of link quality values for the first base station radio system. This allows selection not only of an appropriate base station radio system, but also an antenna within that radio system that is useful for optimal combining. The radio link quality used for selecting a radio arrangement can optionally be different from that used for selecting a base station radio system.

Beneficially, the method further comprises: instructing the mobile station to transmit an OFDM signal at a specified time, the OFDM signal comprising at least one modulated subcarrier of a specified frequency; allocating resources at the first and second base station transceivers to receive the OFDM signal transmitted by the mobile station; and combining the OFDM signals received by the first and second base station transceivers. In this way, optimal combining of the signals received in the uplink can be achieved using the selection technique. The combining step can optionally be implemented using one or more of: selection combining; switched combining; equal gain combining; and maximal-ratio combining. Other combining techniques known to the skilled person can alternatively be used.

The resources allocated at the first and second base station transceivers to receive the OFDM signal transmitted by the mobile station optionally comprise at least one respective frequency and at one respective time period. Advantageously, the at least one frequency and at one time period allocated at the first and second base station transceivers are the same. If the first base station has allocated resources to a mobile station that is also located within the coverage area of a second base station, transmissions by that mobile station on the uplink could cause interference to the second base station. This would render the resource unsuitable or low priority for allocation to another mobile station attached to the second base station. If this resource were allocated to a second mobile station, it could then interfere with the mobile station attached to the first base station, depending on the position of the second mobile station. Therefore by allocating the same resources across both base stations and combining signals in this way, the uplink coverage and performance of the mobile station can be optimised with little or no impact on system capacity.

Optionally, the method further comprises determining the specified time and the specified frequency by receiving at the first and second base station transceivers an OFDM signal originating from the mobile station, and determining radio link qualities on the basis of the received OFDM signals. This can more preferably use Sounding Reference Symbols transmitted by the mobile station on specific subcarriers in the uplink. The specified time and frequency for allocation can advantageously set by analysis of the Sounding Reference Symbols.

In an aspect, there is provided a computer readable medium having a computer program operable to carry out the method described herein.

In a further aspect, there is provided a network controller for a radio network comprising a mobile station and a plurality of base station radio systems being configured to communicate using Orthogonal Frequency Division Multiplexed, OFDM, signals, each base station radio system being arranged to provide communications coverage over a different geographical area. The network controller comprises: a processor, arranged to determine a plurality of radio link qualities using OFDM signals, each radio link quality relating to a radio link between the mobile station and a respective base station radio system. Then, the processor is further adapted to select first and second base station radio systems from the plurality of base station radio systems for receiving OFDM signals from the mobile station and for combining the received OFDM signals, the selection being based on the determined plurality of radio link qualities.

Optionally, the processor is further configured to compare each of the plurality of radio link qualities with a threshold, and to select the first and second base station radio systems on the basis of the comparison. In one embodiment, the processor is further arranged to set the threshold at a predetermined level. Alternatively, the processor is further arranged to set the threshold on the basis of at least one of the plurality of link qualities.

Preferably, the processor is further arranged to instruct the mobile station to transmit an OFDM signal at a specified time, the OFDM signal comprising at least one modulated subcarrier of a specified frequency, to allocate resources at the first and second base station radio systems to receive the OFDM signal transmitted by the mobile station, and to combine the OFDM signals received by the first and second base station radio systems.

Optionally, the processor is further arranged to determine the specified time and the specified frequency by controlling the first and second base station radio systems to receive an OFDM signal originating from the mobile station, and determining radio link qualities on the basis of the received OFDM signals.

In one embodiment, the processor is further arranged to determine a plurality of radio link qualities by instructing a plurality of base station radio systems each to transmit a respective OFDM signal and by instructing a mobile station to receive the plurality of OFDM signals, to determine each of the plurality of radio link qualities on the basis of a respective one of the plurality of received OFDM signals and to transmit the plurality of radio link qualities from the mobile station to one of the plurality of base station radio systems.

In other or similar embodiments, the processor is further configured to instruct a mobile station to transmit a plurality of OFDM signals and to instruct each of the plurality of base station radio systems to receive the transmitted OFDM signal, the processor being further adapted to determine each of the plurality of radio link qualities on the basis of the OFDM signal received at a respective base station radio system.

There is also provided in an additional aspect, a radio network, comprising the network controller described herein, and further comprising a transceiver, adapted to receive an OFDM signal comprising a plurality of subcarriers. The processor is then further configured to determine a radio link quality on the basis of some of the subcarriers of the received OFDM signal.

Optionally, the transceiver is further configured to measure a received power or signal to noise ratio for some of the subcarriers of the OFDM signal.

In a yet further aspect, there may be found a radio network, comprising the network controller as described herein, and further comprising a first base station radio system, the first base station radio system comprising a plurality of radio arrangements, each radio arrangement comprising a transceiver coupled to a respective antenna.

In an embodiment, at least some of the plurality of radio arrangements for the first base station radio system are located at different places.

Preferably, the radio link quality for the first base station radio system comprises a plurality of link quality values, each link quality value relating to a radio link between the mobile station and a respective radio arrangement of the first base station radio system, the processor of the network controller being further configured to select a radio arrangement of the first base station radio system for receiving OFDM signals from the mobile station and for use in combining the received OFDM signals, the selection being based on the determined plurality of link quality values for the first base station radio system.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

For the purposes of this description, the terms mobile station and base station have been used. The term mobile station is equivalent to the term user equipment (UE) employed in 3GPP standards or the term subscriber station. The term base station can be considered equivalent to the term eNodeB or cell used in 3GPP standards, although it is recognised that the eNodeB and cell are separate concepts in the LTE system. It will equally be understood that the invention can be applied to systems other than LTE, for example WiMAX (based on the IEEE 802.16 standard).

Figure 1:
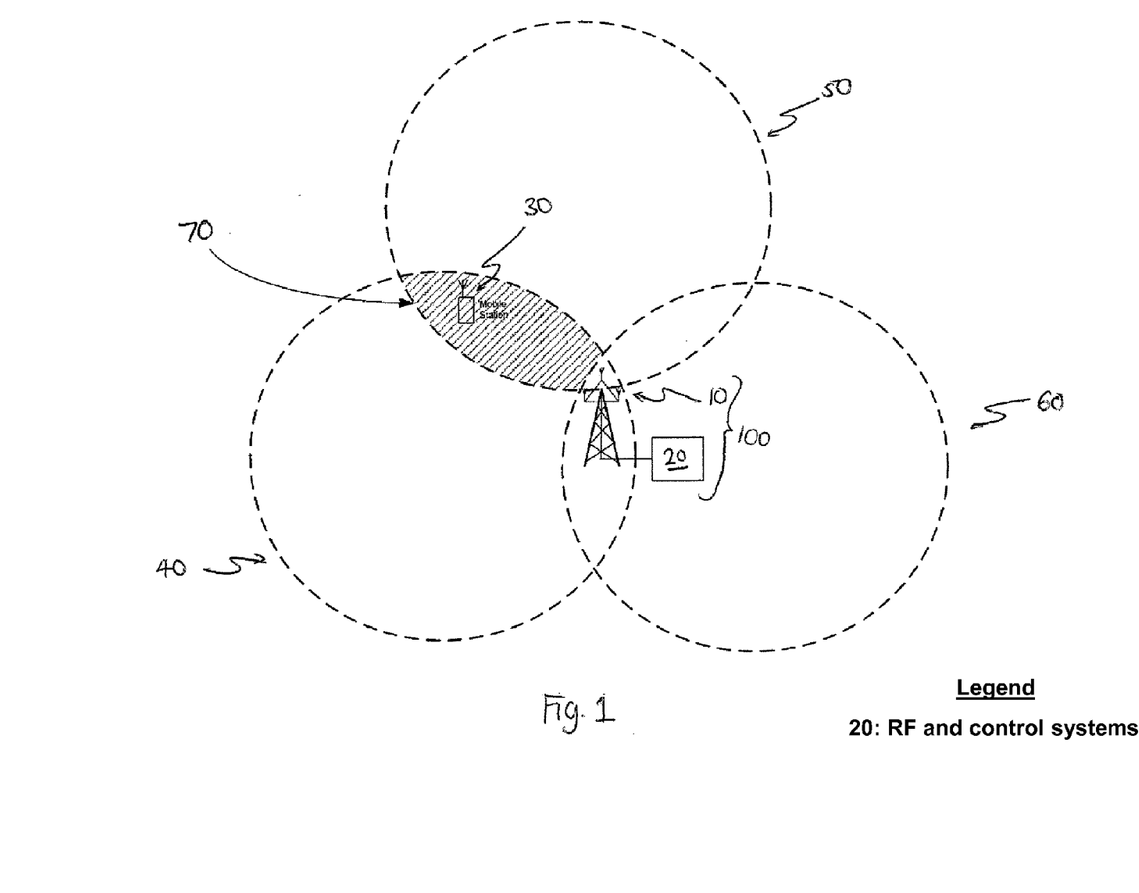
FIG. 1 shows an illustration of a radio network in accordance with the present invention.

Referring first to FIG. 1, there is shown an illustration of a radio network in accordance with the present invention. The radio network comprises a base station 100 and a mobile station 30. The base station 100 comprises an antenna unit 10 and RF and control systems 20.

The base station 100 provides coverage to three separate sectors, each sector being covered by a respective antenna system from the antenna unit 10. The antenna unit 10 comprises multiple antenna systems and each antenna system comprises multiple antennas.

There is therefore shown a first sector 40, a second sector 50 and a third sector 60. These are shown to illustrate the geographical radio coverage provided by the respective antenna system from the base station 100. It will be noted that the geographical radio coverage for first sector 40, second sector 50 and third sector 60 overlaps. One such overlapping area is coverage region 70. The mobile station 30 is located in this coverage region 70.

The mobile station 30 is therefore able to receive signals from the antenna system covering first sector 40 and the antenna system covering second sector 50. Conversely, signals transmitted by the mobile station 30 on the uplink to the base station 100 may be received by the antenna system for the first sector 40 and the antenna system for the second sector 50.

It is desirable to make use of the signals received from both the antenna system for first sector 40 and the antenna system for second sector 50. By making use of both received signals and combining the signals in some way, an improved performance in terms of signal to noise ratio, error rates and capacity can be achieved. This is known as diversity combining. One difficulty is determining the antenna systems and specific antennas to use when combining signals.

Figure 2:
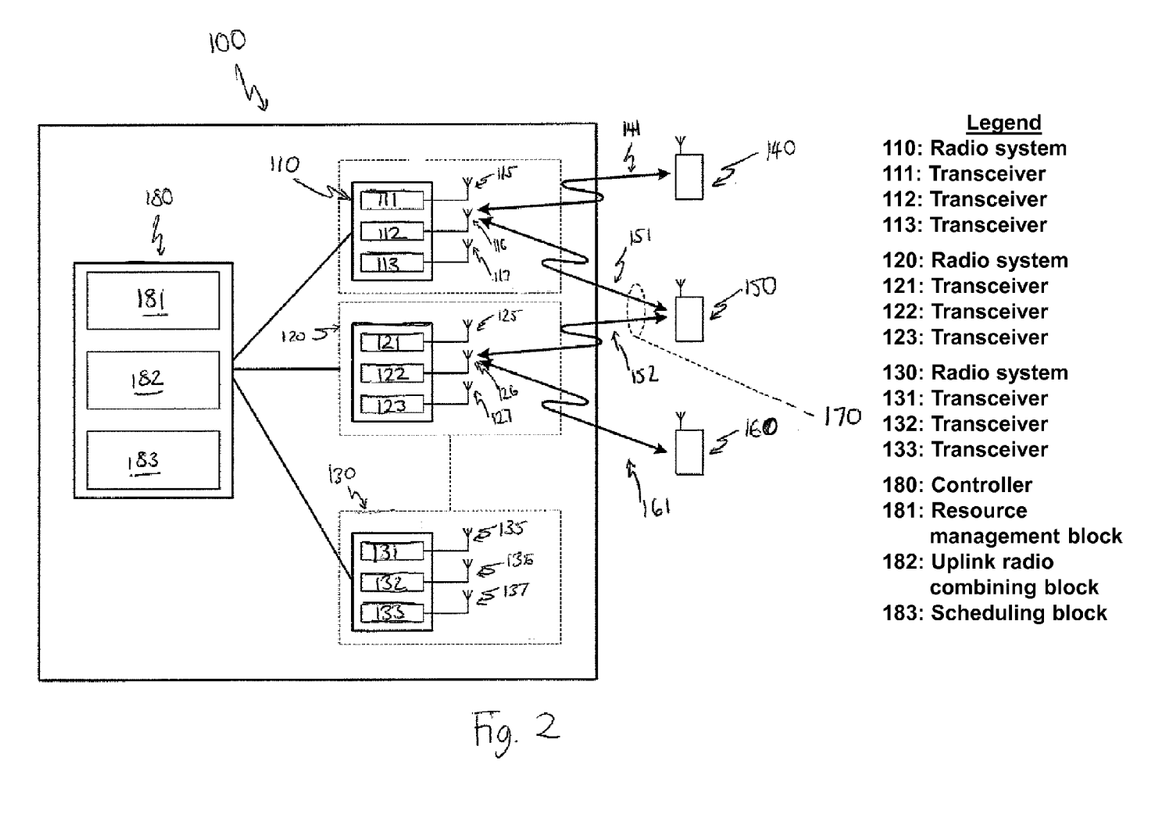
FIG. 2 shows a schematic illustration of the radio structure for use with the radio network of FIG. 1.

Referring next to FIG. 2, there is shown an exemplary radio structure for use in the radio network illustrated in FIG. 1. A significant component of the radio structure is a base station 100. The base station 100 comprises: a first radio system 110; a second radio system 120; a third radio system 130; and a controller 180. FIG. 2 also shows a first mobile station 140; a second mobile station 150; and a third mobile station 160.

The first radio system 110, second radio system 120 and third radio system 130 each provide radio coverage for a respective geographical area. In other words, each of the three radio systems provides coverage for a sector, as illustrated in FIG. 1. Although only three radio systems are shown, the skilled person will appreciate that more radio systems can be used in the same base station, or conversely, fewer radio systems can be employed.

Each radio system comprises three transceivers and each transceiver is coupled to a respective antenna. Consequently, first radio system 110 comprises: first transceiver 110 coupled to first antenna 115; second transceiver 112 coupled to second antenna 116; and third transceiver 113 coupled to third antenna 117. The second radio system 120 comprises: fourth transceiver 121 coupled to fourth antenna 125; fifth transceiver 122 coupled to fifth antenna 126; and sixth transceiver 123 coupled to sixth antenna 127. The third radio system 130 comprises: seventh transceiver 131 coupled to seventh antenna 135; eighth transceiver 132 coupled to eighth antenna 136; and ninth transceiver 133 coupled to ninth antenna 137.

The first mobile station 140 can communicate with the first radio system 110 through first radio link 141. The second mobile station 150 communicates with the first radio system 110 through second radio link 151 and with the second radio system 120 through the third radio link 152. The third mobile station 160 communicates with the second radio system 120 through a fourth radio link 161. Each of these radio links has an associated radio link quality, indicative of the radio propagation characteristics of the respective link.

Controller 180 comprises: a resource management block 181; an uplink radio combining block 182; and a scheduling block 183. The uplink radio combining block 182 identifies that second mobile station 150 can communicate with two radio systems and that, consequently, the uplink signals from the second mobile station 150 can be combined at the base station 100. The way that this identification is made will now be explained.

Figure 3:
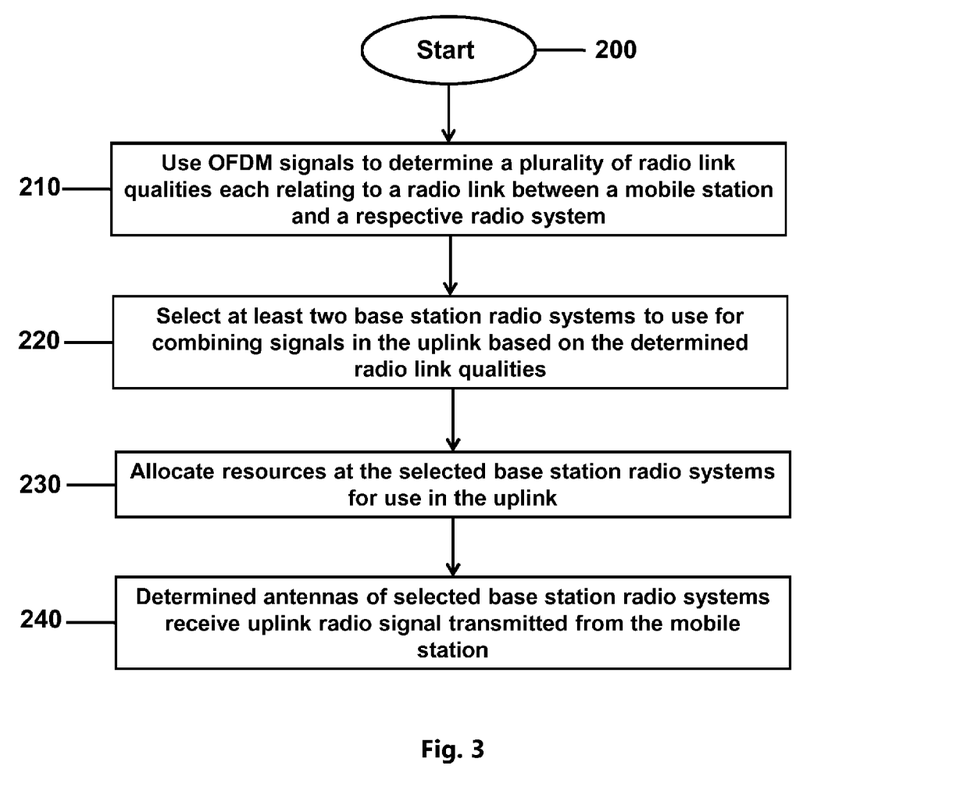
FIG. 3 shows a flowchart showing the operation of an uplink combining block used in FIG. 2.

Referring next to FIG. 3, there is shown a flowchart depicting a method for determining the radio systems to use for combining signals received in the uplink for a specific mobile station. In a first step 200 the process is started. In a second step 210, a plurality of radio link qualities are determined using OFDM signals. Each of these radio link qualities relates to the radio link between a mobile station and a respective radio system. For example, a first radio link quality can relate to the first radio link 141 between the first mobile station 140 and the first radio system 110. Similarly, radio link qualities can be determined for each of the other radio links shown.

In particular, each mobile station in an LTE system measures a Reference Signal Received Power (RSRP) in respect of each base station radio system. 3GPP standard TS 36.211 Release 9 defines the transmission of reference symbols in the downlink. The reference symbols are transmitted over the full downlink channel bandwidth for the cell covered by the base station. Mobile stations measure the reference symbols transmitted by the base station providing them with service. They additionally measure the reference symbols transmitted by other base stations. This is useful for handover purposes, when moving between cells covered by different base stations. RSRP measurements are standardised measurements reported by the mobile station, normally used to detect when a mobile station is proximate to a neighbouring sector from the one currently serving it. This is used for potential handover purposes. As a result, this measurement is also useful for detecting potential strong uplink signals which can be combined between sectors.

This information is reported from the mobile station to the base station serving it. That information can then be passed to the uplink radio combining block 182 in the controller 180.

In a third step 220, at least two base station radio systems are selected for use in combining signals in the uplink. This selection is carried out in the uplink radio combining block 182 and is based on the radio link qualities that were determined in the second step 210. For example, in the case shown in FIG. 2, it may be determined that the second mobile station 150 has a radio link quality with respect to the first radio system 110 and a radio link quality with respect to the second radio system 120 that permits combining.

This conclusion is made by comparing the reported RSRP values with respect to a threshold. This threshold is optionally an absolute value, but alternatively can be made relative to the RSRP of the serving cell. Any base station radio systems for which the determined radio link quality passes the threshold are then selected for uplink combining purposes.

If it is not possible for the mobile station to identify at least two base station radio systems for combining signals in the uplink, the process is terminated. This is not shown in FIG. 3. As a result, not all of the mobile stations in the network will use this complete process. Only those mobile stations that can identify more than one base station radio system suitable for combining uplink signals will benefit from this technique. Processing power, coverage and capacity at each base station is thereby more efficiently used.

In a fourth step 230 resources are allocated at the selected base station radio systems for use in the uplink. These resources are determined in frequency and time, relating to specific subcarriers and symbols in the OFDM signal transmitted by the mobile station. The selected base station radio systems allocate the same uplink radio resources (physical resource blocks) to the mobile system, taking account of any timing offsets. Under normal operation, these same uplink radio resources in adjacent base station radio systems would experience potentially strong interference from the mobile station within the overlapping coverage area rendering the resource unsuitable for allocation to other mobile stations. By allocating and using them in this way the resources can be efficiently utilised.

Also, the mobile station transmits unique reference symbols in the uplink and these are detected by the base station radio systems across all of its receive antennas and passed to the eNodeB, which corresponds with the controller 180 shown in FIG. 2. The eNodeB is then able to determine, according to the instantaneous channel conditions, which antenna signals to combine from the selected base station radio systems.

LTE mobile stations can also transmit uplink sounding reference symbols (SRS), especially when normal data is not being transmitted. These, which are different from the reference symbols transmitted during normal data traffic, can be used by the base station 100 to estimate the uplink radio resources for optimum radio resource allocation. This estimation is carried out both in frequency, relating to the respective subcarriers, and in time. Moreover, the SRS information can be used to determine which specific antennas from the multiple antennas forming part of a radio system to be used for the combination of signals to made from that base station radio system. Using the SRS information means that the base station 100 does not need to employ a period of time of normal data transmission, which would involve the transmission of uplink reference symbols, to decide on which base station radio systems to combine.

Under a high system load, the network controller responsible for overall resource management may decide not to allocate the same resources and combine uplink signals. This could be implemented in order to maximise system capacity or to maximise the number of connected mobile stations, but at the potential expense of individual mobile station performance. This trade-off between overall system capacity and individual mobile station link performance is another parameter which may be considered in the decision process taken by the network controller on whether to combine uplink signals.

In a fifth step 240, the mobile station transmits an uplink radio signal, which is received by the determined antennas from the selected base station radio systems. The received signals are transferred from each base station radio system to the controller 180, which then combines the signals and carries out detection. Typically, combining signals and detection of the received data does not take place at the radio systems, but rather at a central network controller. The skilled person will recognise that there are many different ways to combine signals and detect combined signals to achieve this result. For example, selection combining, switched combining, equal gain combining and maximal-ratio combining are all known diversity combining techniques.

The skilled person will be aware that various modifications to the above identified embodiment can be made. For example, the base station radio systems can each use differing numbers of transceivers. For example, a base station radio system can employ only one transceiver. Also, each transceiver can use more than one antenna. Similarly, it will also be recognised that each mobile station can use more than one antenna.

Although RSRP measurements are used in the above embodiment to identify radio link qualities, other measurements using the reference symbols, such as signal to noise ratios can alternatively be used. Alternatively, measurements of other symbols within the downlink transmissions or measurements by the base station of uplink transmissions, such as reference symbol or SRS information, can be used to determine radio link qualities.

Absolute and relative thresholds are detailed in the described embodiment for determining whether the determined radio link quality means that the link should be used for combining in the uplink. However, the skilled person will understand that other ways of making this determination can be implemented, based on other methodologies or criteria: for example, by selecting the two base station radio systems with the highest link quality. Optionally, other information can additionally be used to determine the radio systems for combining, such as location, radio system availability and capacity.

The invention claimed is:

1. A method of operating a radio network, the radio network comprising a mobile station and a plurality of base station radio systems being configured to communicate using Orthogonal Frequency Division Multiplexed (OFDM) signals, each base station radio system being configured to provide communications coverage over a different geographical area and comprising a respective plurality of radio arrangements, each radio arrangement comprising a transceiver and a respective antenna, the method comprising:

determining a plurality of radio link qualities using OFDM signals transmitted between the plurality of base station radio systems and the mobile station, each radio link quality relating to a radio link between the mobile station and a respective base station radio system of the plurality of base station radio systems;

performing an analysis of the plurality of radio link qualities determined using OFDM signals transmitted between the plurality of base station radio systems and the mobile station to select first and second radio links respectively relating to first and second radio link qualities of the plurality of radio link qualities that are determined, based on the analysis of the plurality of radio link qualities, to be suitable for use in combining OFDM signals transmitted by the mobile station;

selecting the respective base station radio system for the first radio link and the respective base station radio system for the second radio link for receiving OFDM signals from the mobile station; and combining the OFDM signals received from the mobile station by the respective base station radio system for the first radio link and the respective base station radio system for the second radio link.

2. The method of claim 1, wherein the step of determining a plurality of radio link qualities comprises:

receiving an OFDM signal comprising a plurality of subcarriers; and determining a radio link quality on the basis of some of the subcarriers of the received OFDM signal.

3. The method of claim 2, wherein the step of determining a radio link quality comprises measuring a received power or signal to noise ratio for the some of the subcarriers of the OFDM signal.

4. The method of claim 1, wherein the step of determining a plurality of radio link qualities comprises:

receiving at the mobile station a plurality of OFDM signals, each OFDM signal originating from a respective base station radio system;

determining at the mobile station, each of the plurality of radio link qualities on the basis of a respective one of the plurality of received OFDM signals; and transmitting the plurality of radio link qualities from the mobile station to one of the plurality of base station radio systems.

5. The method of claim 1, wherein the step of determining a plurality of radio link qualities comprises:

receiving at each of the plurality of base station radio systems an OFDM signal originating from the mobile station; and determining each of the plurality of radio link qualities on the basis of the OFDM signal received at a respective base station radio system.

6. The method of claim 1, wherein the analysis of the plurality of radio link qualities determined using OFDM signals transmitted between the plurality of base station radio systems and the mobile station to select the first radio link and the second radio links comprises:

comparing each of the plurality of radio link qualities with a threshold;

determining the first and second radio link qualities to be suitable for use in combining OFDM signals transmitted by the mobile station based on the comparison of each of the plurality of radio link qualities with the threshold; and selecting the first radio link and second radio link by identifying and selecting the radio links that respectively relate to the first and second radio link qualities.

7. The method of claim 1, further comprising:

instructing the mobile station to transmit an OFDM signal at a specified time, the OFDM signal comprising at least one modulated subcarrier of a specified frequency;

allocating resources at the first respective base station radio systems for the first radio link and the respective base station radio system for the second radio link to receive the OFDM signal transmitted by the mobile station; and combining the OFDM signals received from the mobile station by the respective base station radio system for the first radio link and the respective base station radio system for the second radio link.

8. A non-transitory computer readable medium having a computer program stored thereon for execution by a processor to carry out the method of claim 1.

9. A network controller for a radio network comprising a mobile station and a plurality of base station radio systems being configured to communicate using Orthogonal Frequency Division Multiplexed (OFDM) signals, each base station radio system being configured to provide communications coverage over a different geographical area and comprising a respective plurality of radio arrangements, each radio arrangement comprising a transceiver and a respective antenna, the network controller comprising:

a processor; configured to determine a plurality of radio link qualities using OFDM signals transmitted between the plurality of base station radio systems and the mobile station, each radio link quality relating to a radio link between the mobile station and a respective base station radio system of the plurality of base station radio systems;

wherein the processor is further configured to:

perform an analysis of the plurality of radio link qualities determined using OFDM signals transmitted between the plurality of base station radio systems and the mobile station to select first and second radio links respectively relating to first and second radio link qualities of the plurality of radio link qualities that are determined, based on the analysis of the plurality of radio link qualities, to be suitable for use in combining OFDM signals transmitted by the mobile station; and select the respective base station radio system for the first radio link and the respective base station radio system for the second radio link for receiving OFDM signals from the mobile station; and wherein the OFDM signals received from the mobile station by the respective base station radio system for the first radio link and the respective base station radio system for the second radio link are combined based on the selection of the respective base station radio system for the first radio link and the respective base station radio system for the second radio link.

10. The network controller of claim 9, wherein the processor is further configured to compare each of the plurality of radio link qualities with a threshold, to determine the first and second radio link qualities to be suitable for use in combining OFDM Signals transmitted by the mobile station based on the comparison of each of the plurality of radio link qualities with the threshold, and to select the first radio link and second radio link by identifying and selecting the radio links that respectively to the first and second radio link qualities.

11. The network controller of claim 9, wherein the processor is further configured to instruct the mobile station to transmit an OFDM signal at a specified time, the OFDM signal comprising at least one modulated subcarrier of a specified frequency, to allocate resources at the first respective base station radio system for the first radio link and the respective base station radio system for the second radio link to receive the OFDM signal transmitted by the mobile station, and to combine the OFDM signals received from the mobile station by the respective base station radio system for the first radio link and the respective base station radio system for the second radio link.

12. The network controller of claim 11, wherein the processor is further configured to determine the specified time and the specified frequency by controlling the respective base station radio system for the first radio link and the respective base station radio system for the second radio link to receive an OFDM signal originating from the mobile station, and determining radio link qualities on the basis of the received OFDM signals.

13. The network controller of claim 9, wherein the processor is further configured to determine the plurality of radio link qualities by instructing the plurality of base station radio systems each to transmit a respective OFDM signal and by instructing the mobile station to receive the plurality of OFDM signals, to determine each of the plurality of radio link qualities on the basis of a respective one of the plurality of received OFDM signals and to transmit the plurality of radio link qualities from the mobile station to one of the plurality of base station radio systems.

14. The network controller of claim 9, wherein the processor is further configured to instruct the mobile station to transmit an OFDM signal and to instruct each of the plurality of base station radio systems to receive the transmitted OFDM signal, the processor being further configured to determine each of the plurality of radio link qualities on the basis of the OFDM signal received at the respective base station radio system for the radio link quality.

15. The network controller of claim 9, wherein the radio network further comprises a transceiver configured to receive an OFDM signal comprising a plurality of subcarriers; and
   wherein the processor is further configured to determine a radio link quality on the basis of some of the subcarriers of the received OFDM signal.

16. The network controller of claim 15, wherein the transceiver of the radio system is further configured to measure a received power or signal to noise ratio for some of the subcarriers of the OFDM signal.

17. The network controller of claim 9, wherein at least some of the plurality of radio arrangements for the respective base station radio system for the first radio link are located at different places.

18. The network controller of claim 9, wherein a radio link quality for the respective base station radio system for the first radio link comprises a plurality of link quality values, each link quality value relating to a radio link between the mobile station and a respective radio arrangement of the respective base station radio system for the first radio link, the processor of the network controller being further configured to select a radio arrangement of the respective base station radio system for the first radio link for receiving OFDM signals from the mobile station and for use in combining the received OFDM signals, the selection being based on the determined plurality of link quality values for the respective base station radio system for the first radio link.

* * * * *